April 12, 1927.  1,624,262
A. A. LINLEY
SEPARABLE COVER FOR UNIVERSAL BALL JOINT CASES
Filed June 1, 1923

Inventor
Alfred A. Linley

By Chamberlain & Newman
Attorneys

Patented Apr. 12, 1927.

1,624,262

UNITED STATES PATENT OFFICE.

ALFRED A. LINLEY, OF FAIRFIELD, CONNECTICUT.

SEPARABLE COVER FOR UNIVERSAL BALL-JOINT CASES.

Application filed June 1, 1923. Serial No. 642,739

This invention relates to an improved cover device for the universal ball joint of an automobile transmission, and particularly as used in "Ford" cars. With the present type of cover it is impracticable to adjust the same, and the ball soon becomes loose, causing rattling and bumping, and loss of the lubricant. The universal soon wears and finally breaks, and in most cases on the road, causing considerable annoyance and delay.

It is an object of the present invention to provide a cover device which may be adjusted to the very finest degree, so that the ball may be kept perfectly snug at all times, thus insuring adequate lubrication to the universal joint.

A further object is to provide a device designed to be installed, removed or adjusted, without the necessity of dismantling any part of the transmission. A still further object is to provide a device which eliminates rattling, chattering, backlash and bumping, with the consequent annoyance and detrimental effect on the universal joint structure.

With the above and other objects in view, an embodiment of the invention is shown in the accompanying drawings, and this embodiment will be hereinafter more fully described, with reference thereto, and the invention will be finally pointed out in the claims.

In the drawings.

Similar reference characters indicate corresponding parts throughout the several figures of the drawings.

Figure 1:
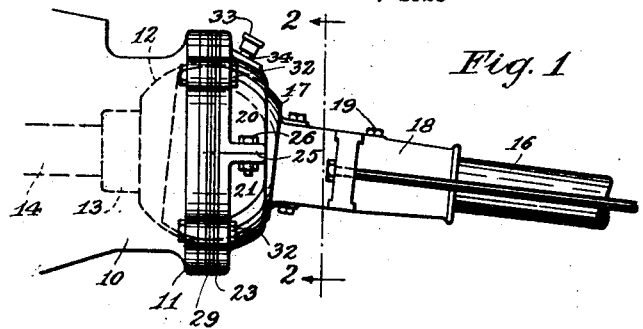
Fig. 1 is a side elevation of a universal ball joint provided with a cover device, according to the present embodiment of the invention.
Figure 2:
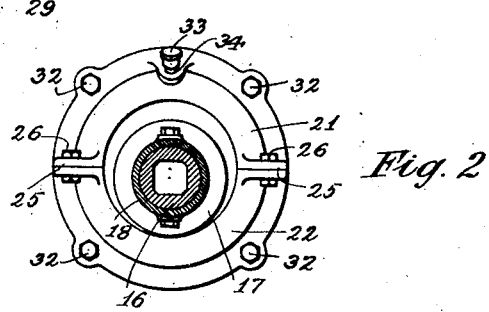
Fig. 2 is a transverse sectional view, taken along the line 2—2 of Fig. 1.
Figure 3:
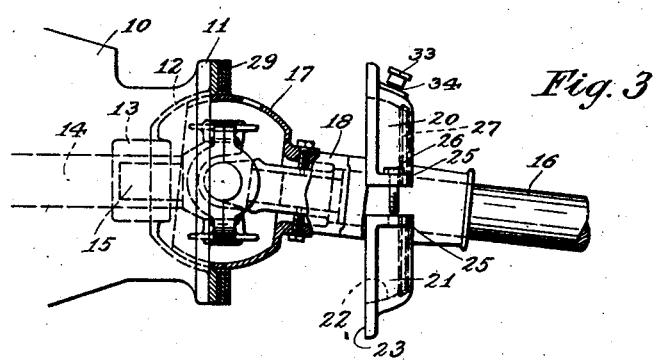
Fig. 3 is a side elevation, partly in section, and showing the cover in detached position.
Figure 4:
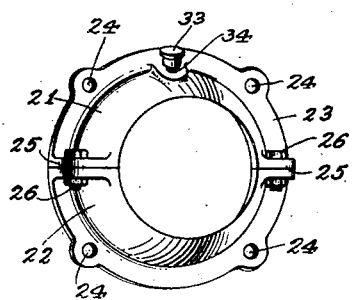
Fig. 4 is a perspective view of the cover.
Figure 5:
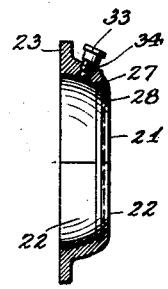
Fig. 5 is a vertical sectional view thereof.
Figure 6:
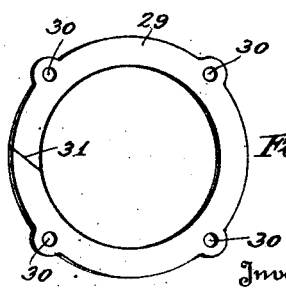
Fig. 6 is a perspective view of one of the shim members employed as a part of the device.

Referring to the drawings, the universal ball joint comprises a hemi-spherical casing member 10 having a flange 11 at its outer end engaging and secured to the transmission casing 12, and provided at its inner end with a projected bearing 13 in which the transmission shaft 14 is journaled. This shaft is connected by a slide joint to a universal joint 15, which in turn is connected to the propeller shaft 16, the joint being enclosed within a ball housing 17 having an extended tubular portion 18 secured by a bolt 19 to the connection between the universal joint and the propeller shaft, and serving to connect the ball housing, the universal joint, and the propeller shaft, so that they rotate together. The structure just described is the well-known "Ford" type of universal joint.

The cover device according to the present invention comprises a two-part ring consisting of upper and lower halves 20 and 21 having a spherical inner surface 22 adapted to engage the outer spherical surface of the ball housing 17, and provided with a flange 23 corresponding in shape to the flange 11 of the hemi-spherical member 10 and provided with a plurality of bolt-receiving apertures 24. The halves are provided at their adjacent portions with apertured lugs 25, through which bolts 26 are engaged and thus secure the halves together to form a ring.

An annular groove 27 is provided adjacent the outer edge of the spherical inner surface 22 within which a felt ring 28 is provided in a manner to snugly engage the surface of the ball 17, and thereby prevent leakage of oil or grease.

Between the flange 11 of the member 10 and the flange 23 of the two-part ring a laminated spacer is inserted, comprising a plurality of ring-shaped shims 29, having apertures 30 in line with the apertures 24 of the flange 23, and split, as at 31, to permit of their being slipped upon the shaft or removed therefrom.

The two-part ring is secured in place by bolts 32 engaging the apertures 24, and passing through the shims and the flange 11 into threaded engagement with the transmission casing 13.

A grease-cup 33 is provided in the upper half-ring 20, and is adapted to supply lubricant to the surface of the ball 17, and to the universal joint therein, through an opening 34 of said ball.

The cover device is installed with great facility, the two halves of the cover ring being placed about the shaft and connected by the bolts 26, before attachment to the transmission casing. A plurality of the shims 29 are put in place, and the cover ring thereupon secured to the transmission casing by the screw bolts 32, these bolts also securing the shims and the hemi-spherical casing 10. By removing one or more of the shims the ball may be kept in perfect adjustment at all times. The felt ring for preventing leakage of the lubricant, together with the fact that the ball may be kept perfectly snug at all times, insures perfect lubrication to the universal joint, and therefore breakage and wear, because of insufficient lubrication, is prevented. The perfect adjustment afforded by the device effectually eliminates looseness, and consequent rattling, chattering and backlash.

I have illustrated and described a preferred and satisfactory embodiment of the invention, but it is obvious that changes may be made therein, within the spirit and scope thereof, as defined in the appended claims.

Having thus described my invention, what I claim and desire to secure by Letters Patent is:

1. In combination with a universal joint having a ball housing and shafts extending in opposite directions therefrom, and a transmission casing surrounding said ball housing at one side, a cover device comprising a two-part ring separable diametrically to be placed in sections about the periphery of that shaft opposite the transmission casing, means for securing said parts of the ring to each other after they are placed about said periphery to provide a spherical inner face of said ring adapted to engage the surface of said ball, means for securing said ring to said transmission case, and a spacing member between said ring and ball, the spacing member being split to be slipped upon said opposite shaft from a side thereof.

2. A collar for universal ball joints comprising a pair of semi-annular and interiorly spherical-shaped members having their corresponding adjacent ends detachably connected to each other, and each of said members having one edge provided with a laterally extending flange for detachable connection with the corresponding flange of the transmission casing, and adjustable means for taking up wear.

Signed at Bridgeport in the county of Fairfield and State of Connecticut this 28th day of May, A. D. 1923.

ALFRED A. LINLEY.